Figure 1:
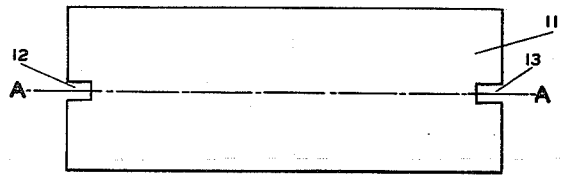

April 9, 1946.  A. J. DEYRUP  2,398,176

ELECTRICAL CAPACITOR

Filed March 15, 1943

INVENTOR
ALDEN J DEYRUP
BY
ATTORNEY

Patented Apr. 9, 1946

2,398,176

UNITED STATES PATENT OFFICE 2,398,176

ELECTRICAL CAPACITOR

Alden J. Deyrup, Westfield, N. J., assignor to E. I. du Pont de Nemours & Company, Wilmington, Del., a corporation of Delaware Application March 15, 1943, Serial No. 479,156

4 Claims. (Cl. 29—25.42)

This invention relates to the manufacture of ceramic electrical condensers and resistors, more particularly to novel means for providing permanent and mechanically strong electrical connections for these ceramic condensers and resistors, and for providing an insulating ceramic glaze for mechanical and electrical protection over the said connections.

Many forms of ceramic condensers and resistors are used in apparatus for transmission and reception of electrical signals. For example resistors may be made by coating porcelain or other ceramic tubes with a resistive material and crimping conductive metallic members, to which electrical connections may be soldered, to the ends of the coated tubes. Ceramic condensers known in the art may be exemplified by porcelain, steatite porcelain, or titanium porcelain tubes, coated inside with an application of silver powder or a mixture of silver powder with finely divided low melting vitreous enamel and coated outside with a similar coating. After firing to bond the silver to the ceramic body the outer layer forms one conductive plate of the condenser, the inner layer forms the other plate and the ceramic tube serves as dielectric. Electrical connections have been secured by soldering copper wires to the inner and outer conductive plates.

Another example of construction of a ceramic condenser is described in the pending application of Ballard, Serial No. 461,302, filed October 8, 1942, wherein a ceramic silver electrode (formed by firing a coating of silver powder or silver powder mixed with ceramic bonding material) is applied to a ceramic base such as porcelain, the electrode is covered with a vitreous dielectric by application and firing of a powdered vitreous glaze, and provided with a second electrode by application of a second layer of ceramic silver. The electrical connections may be formed by soldering copper wires to exposed portions of the two electrodes.

Crimped, compressed, riveted and bolted electrical connections to the conductive parts of ceramic condensers and resistors are commonly considered not completely permanent because such connections may work loose under conditions of vibration or other mechanical abuse and corrosion may occur resulting in loss of conductivity at the point of electrical contact. Soldered connections are commonly considered to be preferable. Some difficulty has however been encountered in soldering to ceramic silver condenser plates. It is found that solders tend to dissolve the ceramic silver, and exceptional care must be maintained to apply the solder at just the correct heat and not maintain the heat for more or less than the optimum time if mechanically strong connections are to be secured. In the case of tubular condensers it is customary to wind one or more turns of the wire around the tube before soldering to provide sufficient mechanical strength.

It is desirable to glaze ceramic condensers and resistors all over to diminish electrical surface leakage, and to protect the electrical parts from mechanical abuse and to provide insulation of the conductive surface in case the body of the condenser or resistor should accidentally be grounded. This cannot be done conveniently with customary methods of providing electrical connections because crimped, riveted, compressed or bolted connections oxidize, soften and warp and soldered connections melt at the temperatures at which known vitreous enamels mature (generally over 500° C.).

An object of this invention is to provide means of permanent electrical connection of great mechanical strength, not subject to loss of conductivity through vibration or mechanical abuse. A further object of this invention is to provide an electrical connection which may be coated with an insulating ceramic glaze at temperatures of 400°–800° C. if desired. A further object of this invention is to provide means of electrical connection not subject to loss of conductivity by corrosion, oxidation or tarnishing.

I have found that a joint of surprising strength may be obtained by placing an electrically conductive wire in direct contact with the ceramic condenser or resistor, particularly in contact with the electrode or conductive surface respectively, applying an electrically conductive paint or paste, comprising silver powder, to the wire and electrode or conductive surface respectively, covering the wire, conductive paint, and electrode or conductive surface at their juncture with a substantial layer of finely powdered vitreous enamel, and firing to mature the conductive paint or paste and the supernatant vitreous enamel. The whole condenser or resistor may, if desired, be coated thereafter with a vitreous enamel, enclosing the electrical parts thereby.

The invention is illustrated, in application to a condenser, in the accompanying drawing wherein Figure 1 is a plan view of a porcelain tile, or similar base member. This view shows the slots in the end faces of the tile wherein the electrical conductors are positioned.

Figure 2:

Figure 2 is a cross-sectional view taken on the line A—A of Figure 1 showing an electrical condenser formed by positioning metallic layers as electrodes on either side of a dielectric vitreous enamel. The construction of electrical condensers in this manner is disclosed and claimed in the co-pending application of Kermit H. Ballard, Serial No. 461,302, filed October 8, 1942.

Figure 3:
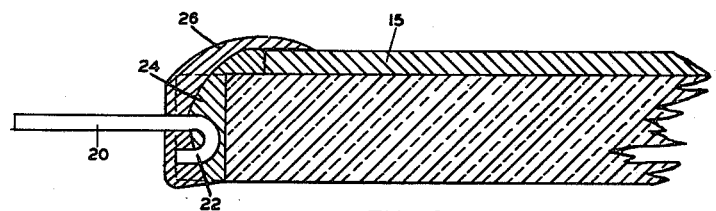

Figure 3 is a cross-sectional view taken on the line A—A of Figure 1, the electrical conductor or wire being shown in elevation. This view illustrates the manner in which an electrical conductor is connected to one metallic electrode of the condenser shown in Figure 2.

Figure 4:
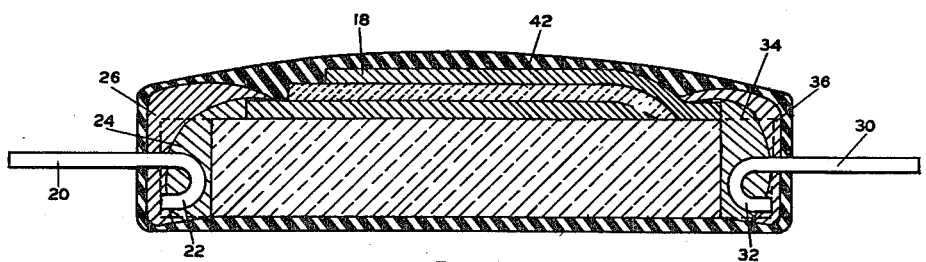

Figure 4 is a view of the completed electrical condenser assembly, the view being in cross-section except for the electrical conductors which are shown in elevation. This view shows the manner in which the electrical conductors or wires are connected to the metallic leaves or electrodes of the condenser, and are insulated by the use of a vitreous enamel dielectric layer. It also shows the outside sealing or cover layer of vitreous enamel positioned completely around the outside surfaces of the condenser.

Referring more especially to Figure 1, element 11 is a flat porcelain tile provided at either end with two slots 12 and 13, these slots having the dimensions, as an example, of 0.04 inch in width and 0.06 inch in depth into the body of the porcelain. As shown, they extend throughout the entire depth or height of the ceramic tile member. In place of porcelain, any other insulating material, preferably ceramic, may be utilized to construct the base member 11.

As shown more fully in Figure 2, there is first positioned on the base member 11 a metallic conducting layer 15, preferably of silver, following the procedure, more fully described in the copending application of Kermit H. Ballard, Serial No. 461,302 filed October 8, 1942. This may be applied in the form of a powdered metal, such as silver, suspended in a suitable vehicle, the powdered metal being fired in place after application. This metallic sheet, which is firmly adherent to the base material of porcelain or other ceramic material, forms one of the plates or electrodes of the condenser.

On top of metallic plate member 15 there is positioned a layer 16 of vitreous enamel, said vitreous enamel serving as the dielectric of the condenser. This may be a lead bisilicate glaze, for example one having the composition lead oxide (PbO) 65%; silica ($SiO_2$) 35%; the percentages being by weight. One or more coats may be applied, preferably by spraying a suspension of finely powdered glaze, the piece being masked during application to leave one end of the electrode 15 bare. The glaze is then fired in place at an elevated temperature, for example one in the neighborhood of 720° C.

On top of the dielectric insulating layer 16 there is positioned the second electrode 18 similar to the first electrode 15. Any suitable means to form a metallic plate or layer, such as by use of powdered silver, may be employed. Very satisfactory results have been secured by utilizing finely powdered silver dispersed in a suitable commercial ceramic squeegee vehicle. The layer is applied to the dielectric vitreous enamel layer 16 by the well-known squeegee method, and fired at an elevated temperature, for example one in the neighborhood of 600° C., utilizing a decorating lehr. The completed article, illustrated in Figure 2, is an embodiment of the construction disclosed in the aforesaid copending Ballard application, but without the necessary electrical connections.

Figure 3 show the manner in which an electrical conductor 20 (for example, No. 20 B & S gauge copper wire) is brought into electrical contact with metallic plate 15 of the condenser. The hooked ends of the conductor or wire, which may be of copper or other conducting material (these ends being numbered 22) are first dipped into a conductive paste. This paste may consist, for example, of 30 parts of finely powdered silver (prepared by precipitation and reduction), 30 parts of finely powdered lead bisilicate glaze (65% PbO, 35% $SiO_2$), 3 parts of methyl cellulose (the 25 centipoise viscosity grade), and 37 parts of water. The hooked ends of the wire 22 are inserted in the slots 12 in the porcelain base member and conductive paste is painted from the wires up to make contact with the condenser plate or electrode 15. After drying, there results a conducting metallic member 24, positioned in the slot 12, which serves to bring conductor 20 into electrical communication with condenser plate 15.

The rest of the slot 12 is now filled and the hook end 22 of conductor 20 completely covered with a sealing paste. This may consist, for example, of 70 parts of the previously described finely powdered lead bisilicate glaze, 2 parts of methyl cellulose (25 centipose grade), and 28 parts of water. After drying, the methyl cellulose, which initially served as suspending agent, provides sufficient strength so that the entire condenser can be held by the conducting wire during ensuing operations.

As shown in Figure 4, the other electrode or plate 18 of the condenser is similarly brought into electrical communication with the wire or electrical conductor 30 provided with hooked end 32. This is accomplished by means of conductive paste 34, similar to and applied in the same manner as conductive paste 24. This conducting paste, after drying, serves to bring wire 30 into electrical communication with electrode 18. Over this there is applied, exactly as in the other slot of the slotted base member 11, sealing paste 36, similar to sealing paste 26 and consisting of 70 parts finely powdered lead bisilicate glaze (65% PbO, 35% $SiO_2$) 2 parts of methyl cellulose, and 28 parts of water.

The electrical condenser is now ready for application of the outside sealing or electrically insulating coating 42. A suspension of the previously described finely powdered lead bisilicate glaze in water is prepared, and the condenser coated all over on its outer surface with the finely powdered glaze. The entire article may then be fired, for example at a temperature of 720° C., the glaze melting and forming the outside insulating and sealing layer 42. The finished condenser is then complete with permanent electrical connections and insulating cover glaze 42.

Electrical condensers prepared in accordance with the foregoing description have been found to possess excellent electrical properties. They exhibit very low leakage losses under normal humidity conditions. While severe mechanical abuse will result in the breaking of the conducting wires, ordinarily the condenser member itself cannot be seriously injured short of damage such as to bring about its total destruction.

If desired, in addition to and superimposed upon the sealing enamel 42, a crystalline oxide compound may be utilized to provide a covering layer, and this then followed by the application thereto of an outer coating of organic material such as oil or wax, as disclosed in my co-pending application, Serial No. 474,679 filed February 4, 1943. Utilizing the method of providing electrical connections thus described it has been possible to produce electrical condensers of such high quality that upon boiling in salt water for 15 minutes followed by quenching in cold salt water the direct current resistance is substantially unaffected, remaining in excess of 1 million megohms as tested immediately after removal from the cold salt water.

In practicing my invention it is ordinarily preferred to provide intimate contact between conducting wires 20 and 30, and the ceramic body 11. This may be accomplished by embedding the wire in the ceramic block 11, as by the slot and hook method described, or by embedding the wire in a hole or aperture in the base member 11. Other means may be utilized to provide a mechanically strong construction, and various alternative constructions falling within the scope of my invention will be apparent.

In preparing the electrical connections for condensers or resistors such as that illustrated for a condenser in the drawing, ordinarily I prefer to use copper wire for the conducting members 20 and 30 because of the very satisfactory electrical conducting characteristics of this material. However, these conductors may be in the form of ribbon or lugs pressed from sheet material, and can be formed of other material such as silver. When practicing my invention I have observed that the copper wire or other conducting members 20 and 30 become coated with a thin layer of oxide during the firing step. This may be easily removed by treatment with acid, or, if preferred, by agitating the condensers or resistors in bulk with sand and water thereby abrading off the oxidic coating.

In practicing my invention silver powder, or a mixture of silver powder and vitreous powdered glaze or other ceramic bonding agent, may be utilized for the electrically conductive paint or paste. The sealing enamel may be any vitreous enamel whose expansion coefficient does not differ too greatly from that of the ceramic body 11 forming the base. The exact thickness of this base member is not important but should be sufficient to impart the necessary strength to the finished construction.

The cover enamel may be any vitreous enamel, pure vitreous material, or pigmented or opacified as desired. It should possess low hygroscopicity and an expansion coefficient not exceeding that of the ceramic body by over approximately 20%.

The number of firing operations utilized in producing the finished condenser or resistor may be varied at will. For example, firing may occur after each coating operation, or may be deferred until several coats are on the base material and are ready for fusing.

While the illustration of this invention refers to its application in providing electrical connections for condensers, it will be readily apparent that the invention is equally applicable to provision of electrical connections for electrical resistors on ceramic bases. In such application to resistors it provides a stronger and more stable connection than conventional methods of crimping, riveting, and the like.

While I have described my invention with reference to certain preferred specific embodiments thereof, I do not wish to be limited thereto, as obvious modifications will occur to those skilled in the art without departing from the spirit or scope of the invention.

I claim:

1. The method of forming an electrical connection for an electrical condenser which comprises: positioning a metallic layer which serves as one electrode of said condenser on an insulating base plate, said base plate being provided with a notch in an edge portion thereof; bringing an external conductor member into mechanical juxtaposition with said insulating base plate by positioning part of said conductor member in said notch; and filling a portion of said notch with an electrically conducting paste to provide for electrical communication between said metallic lower electrode and said external conductor member.

2. The method of constructing an electrical condenser which comprises: positioning a metallic layer to serve as one electrode of said condenser on a ceramic base plate, said ceramic base plate being provided with a notch therein; bringing an external conductor member into mechanical juxtaposition with said ceramic base plate by positioning part of said conductor member in said notch; filling a portion of said notch with an electrically conducting paste to provide for electrical communication between said metallic layer electrode and said conductor member; and positioning a layer of vitreous enamel in said notch around said conducting paste in such manner as to completely insulate said mass of conducting paste from other portions of the electrical condenser.

3. The method of constructing an electrical condenser which comprises: positioning a metallic electrode layer on a ceramic base plate, said ceramic base plate being provided with notches in the end portions thereof; positioning a vitreous dielectric enamel on said metallic electrode; positioning a second metallic electrode layer on said vitreous enamel; bringing a plurality of external conductor members having bent end portions into mechanical juxtaposition with said ceramic base plate by positioning said bent portions of said external conductor members in said notches in said ceramic base plate; bringing said external conductor members into electrical communication with said metallic electrode layers by positioning metallic conducting paste therebetween; and providing an external sealing coating which serves to seal and electrically insulate said electrical condenser.

4. The method of constructing an electrical condenser which comprises: positioning a metallic electrode layer on a ceramic base plate, said ceramic base plate being provided with notches in the end portions thereof; positioning a vitreous dielectric enamel on said metallic electrode; positioning a second metallic electrode layer on said vitreous enamel; bringing a plurality of external conductor members having bent end portions into mechanical juxtaposition with said ceramic base plate, by positioning said bent portions of said external conductor members in said notches in said ceramic base plate; bringing said external conductor members into electrical communication with said metallic electrode layers by positioning a metallic conducting paste therebetween; positioning a vitreous enamel having electrical insulating properties around said external conductors and said metallic paste in such manner as to electrically insulate said electrodes; and applying to all external surfaces of said condenser a vitreous sealing enamel.

ALDEN J. DEYRUP.